(12) United States Patent
Lin

(10) Patent No.: US 7,658,786 B2
(45) Date of Patent: Feb. 9, 2010

(54) METHOD FOR IMPROVING THE AIR QUALITY IN THE LIMITED SPACE AND THE EQUIPMENT USING THEREOF

(76) Inventor: Loufei Lin, No. 338 Ningkang WestRoad, Yueqing, Zhejiang (CN) 325600

(*) Notice: Subject to any disclaimer, the term of this patent is extended or adjusted under 35 U.S.C. 154(b) by 357 days.

(21) Appl. No.: 10/558,212

(22) PCT Filed: May 28, 2004

(86) PCT No.: PCT/CN2004/000565

§ 371 (c)(1),
(2), (4) Date: Nov. 26, 2005

(87) PCT Pub. No.: WO2004/106815

PCT Pub. Date: Dec. 9, 2004

(65) Prior Publication Data

US 2006/0288865 A1 Dec. 28, 2006

(30) Foreign Application Priority Data

May 28, 2003 (CN) ............................. 03 1 36962
Aug. 8, 2003 (CN) ............................. 03 1 53313

(51) Int. Cl.
*B01D 53/02* (2006.01)
(52) U.S. Cl. ............................. 95/96; 96/130; 55/385.2; 55/467; 128/205.12; 128/205.26
(58) Field of Classification Search ............... 95/96; 55/385.2, 467; 96/121, 130; 128/205.12, 128/205.26
See application file for complete search history.

(56) References Cited

FOREIGN PATENT DOCUMENTS

| CN | 2443271 Y | 8/2001 | |
|----|-----------|--------|---|
| CN | 2463731 Y | 12/2001 | |
| JP | 63083522 A | * 4/1988 | ................ 62/78 |
| JP | 2-136631 A | 5/1990 | |
| JP | 6-185759 A | 7/1994 | |
| JP | 10-234836 A | 9/1998 | |

* cited by examiner

*Primary Examiner*—Robert A Hopkins

(57) ABSTRACT

The present invention provides a method for improving the air quality in the limited space and the equipment using thereof. The said method is that the air suctioned from the limited space is transferred to the outside of the limited space and acts as an air source for making oxygen. The oxygen is extracted from the said air source and the waste gas generated thereby is directly discharged to the outside of the limited space. The oxygen extracted is transferred into the limited space and offered the said space by means of the oxygen-supply controller. In addition, the atmosphere is supplemented into the limited space when the air inside is suctioned out. The equipment for the said method includes an indoor machine positioned in the limited space, an outdoor machine and an atmosphere supplement equipment. The present invention can supplement the atmosphere into the limited space while suctioning the air from the space, and can circulate, cool (heat), dehumidify and disinfect the air in the limited space at the same time. Consequently the quality of the said air in the limited space is improved effectively and the oxygen concentration in the limited space is ensured at a prescribed range.

16 Claims, 7 Drawing Sheets

METHOD FOR IMPROVING THE AIR QUALITY IN THE LIMITED SPACE AND THE EQUIPMENT USING THEREOF

This application is the national phase under 35 U.S.C. § 371 of PCT International Application No. PCT/CN2004/000565 which has an International filing date of May 28, 2004, which designated the United States of America.

BACKGROUND OF THE INVENTION

1. Field of the Invention

The present invention relates to a method for improving air quality in a limited space and an equipment used thereof, and, more particularly, to a method for suctioning air from the limited space, making oxygen outside the limited space and supplying oxygen for breath into the limited space, and an equipment used thereof.

2. Background of the Related Art

Air conditioner provides a comfort environment for people's work and living. For this reason, as the development of society, the air conditioner has been used widely. Unfortunately, however, as the limited space is required to be enclosed, there is a negative effect occurred that long-term use deteriorates air quality in the limited space. Particularly, this easily attribute to disease infection and spread. During SARS in 2003, in order to prevent virus of SARS from infecting through air, almost all air conditioners, especially central air conditioners, are turned off according to the requirement of the Chinese Ministry of Health. Meanwhile, for enhancing ventilation, it is required to open all of the windows and doors. These enforced measures make advantages of the air conditioners void.

In addition, an advanced multi-function disinfecting machine has functions of disinfect, deodorization and air purification. It is used in places of easy infection for professionally disinfect and air purification, such as operation rooms in hospitals. However, the disinfecting machine has neither a function of cooling or heating that an air conditioner has, nor a function of air exchange. In addition, the operation of the disinfecting machine is professional and the cost is expensive. Therefore, it cannot be used widely.

Furthermore, a small-type pressure swing adsorption (PSA) oxygen concentrator uses air as source. It suctions air with an air compressor and then pressurizes the air. After separation in the PSA, oxygen and nitrogen of the air are separated, thereby obtaining fresh oxygen of high concentration for breath. Thus, the oxygen concentration equipment has a function of health care and a certain effect of treatment. Because the conventional small-type PSA oxygen concentrator is a single unit positioned inside a room, it noises the persons in the room. Furthermore, the conventional small-type PSA oxygen concentrator extracts oxygen for breath from the air in the room, while discharging nitrogen (exhaust gas) left by air separation into the room. With respect to the room with air conditioner therein, after being maintained a closed state for a long term, discharging nitrogen into the room by the indoor oxygen concentrator sharpens the deterioration of the air quality as indoor air quality has been deteriorated.

Therefore, it is necessary to provide a method with low cost to improve air quality in a limited space and to provide oxygen for breath into the limited space, and an equipment used thereof, which is capable of being combined with an air conditioner and making little noise in the limited space.

SUMMARY OF THE INVENTION

An object of the present invention is to provide an equipment for improving air quality in a limited space, which can effectively improve air quality in the limited space and has a low cost.

Another object of the present invention is to provide an equipment for improving air quality in the limited space, which suctions air from the limited space and making oxygen outside the limited space so as to decrease noise in the limited space.

A further object of the present invention is to provide an equipment for improving air quality in the limited space, which can effectively enhance oxygen concentration of air in the limited space and ensure it under safety limits.

Another further object of the present invention is to provide an equipment for improving air quality in the limited space, which may be used together with an air conditioning equipment and may be combined with a set of disinfecting equipment.

In order to solve the above-mentioned problems, a method for improving air quality in a limited space according to the present invention comprises: a process of suctioning air from the limited space, comprising suctioning air from the limited space and transferring them outside the limited space as an air source for making oxygen; a process of making oxygen outside the limited space, comprising extracting oxygen from the air source transferred outside the limited space, and directly discharging waste gas generated therefrom outside the limited space; a process of supplying air into the limited space, comprising transferring extracted oxygen into the limited space and supplying the oxygen via a oxygen-supply controller; and a process of supplementing air into the limited space, comprising supplementing air into the limited space during the process of suctioning air from the limited space.

Preferably, in a circulating process of the air inside the limited space, the air in the limited space circulates through a disinfecting equipment and a heat exchanger so as to achieve temperature control and disinfecting in the limited space.

Preferably, the oxygen is supplied to users in the limited space via a humidification pot and a straw during the process of supplying into the limited space.

Preferably, the oxygen is transferred into the limited space after ionization in an oxygen nozzle and an anion generator during the process of supplying air into the limited space.

Preferably, the process of supplementing air into the limited space starts when a negative pressure occurs in the limited space.

Preferably, the ratio of the air suctioned in the process of suctioning air from the limited space to the oxygen extracted in the process of making oxygen outside the limited space and supplied in the process of supplying air into the limited space is more than 10, and the air supplemented in the process of supplementing air into the limited space equals the difference between the suctioned air in the process of suctioning air from the limited space and supplied oxygen in the process of supplying oxygen into the limited space.

An equipment for improving air quality in a limited space comprises: an inner machine positioned inside the limited space, comprising an air-suction purger and an oxygen-supply controller, wherein the air-suction purger comprises an air outlet and an air inlet communicating with the limited space, and the oxygen-supply controller comprises an oxygen input port and an oxygen output port; an outer machine comprising an air inlet and an oxygen outlet, the air inlet being connected to the air outlet of the air-suction purger, the oxygen outlet being connected to the oxygen input port of the oxygen-supply controller; and an air supplement equipment comprising an air input and a air output, the air input being outside the limited space and the air output being in the limited space.

Preferably, the air-suction purger comprises a housing with air grills, a filter net and a filter element, wherein the filter net and the filter element are enclosed in the housing.

The air supplement equipment is an air balance filter positioned between the limited space and ambient atmosphere.

The oxygen-supply controller comprises a control switch, an electromagnetic valve, a medical humidification pot, a straw and a display alarm for detection of breathing oxygen concentration.

The oxygen-supply controller comprises an oxygen nozzle, an anion generator and an anion output, wherein the anion generator includes a carbon fibre head.

The outer machine includes an outer shell, an inner cabinet, and an oxygen-extraction system, a temperature control equipment and a controller. The oxygen-extraction system, the temperature control equipment and the controller are disposed in the outer shell.

The oxygen-extraction system includes an air input muffler, an air compressor, a gas-water separator, a control valve and a bacterium filter. The gas-water separator is connected to the control valve.

The temperature control equipment includes a heat-dissipation blower and a heat exchanger with a heating pipe. The heat exchanger is connected to the air compressor and the gas-water isolator, and the heat-dissipation blower is mounted between the inner cabinet and the outer shell.

The inner machine includes an inner machine set for air conditioning and a disinfecting equipment.

The inner machine set for air conditioning includes an inner blower for circulating air and a heat exchanger.

The disinfecting equipment includes an air filter, a high-voltage field generator, a micro-duster collector, double layers of Photocatalyst and Silver Nano, an ultraviolet disinfector and an anion generator.

The method for improving air quality in the limited space of the present invention includes the process of suctioning air from the limited space as well as the process of supplementing air that input air into the limited space from outside of the limited space. Furthermore, the equipment for improving air quality in the limited space of the present invention includes the air supplement equipment for supplementing air into the limited space and the oxygen-supply equipment for supplying medical oxygen into the limited space. Therefore, the method and equipment of the present invention can enhance air circulation between inside and outside of the limited space, thereby improving air quality in the limited space under a certain extent. The oxygen concentrator of the present invention is small and extracts oxygen outside the limited space. The oxygen may be transferred into the limited space and be supplied by the medical humidification pot and the straw, thereby providing oxygen for breath into the limited space. Furthermore, the oxygen concentrator may be used together with the air conditioning equipment and the disinfecting equipment.

In addition, the method of the present invention is a solution of suctioning air from the limited space and extracting oxygen outside the limited space, thereby reducing noise in the limited space.

BRIEF DESCRIPTION OF THE DRAWINGS

In the drawings, similar reference numerals denote elements with similar function. A letter after one reference numeral indicates an example of the element denoted by the reference numeral.

DETAILED DESCRIPTION OF A PREFERRED EMBODIMENT

The specific embodiment of a method for improving air quality in a limited space and an equipment used thereof will be described in detail with reference to the accompanying drawings.

Figure 1:
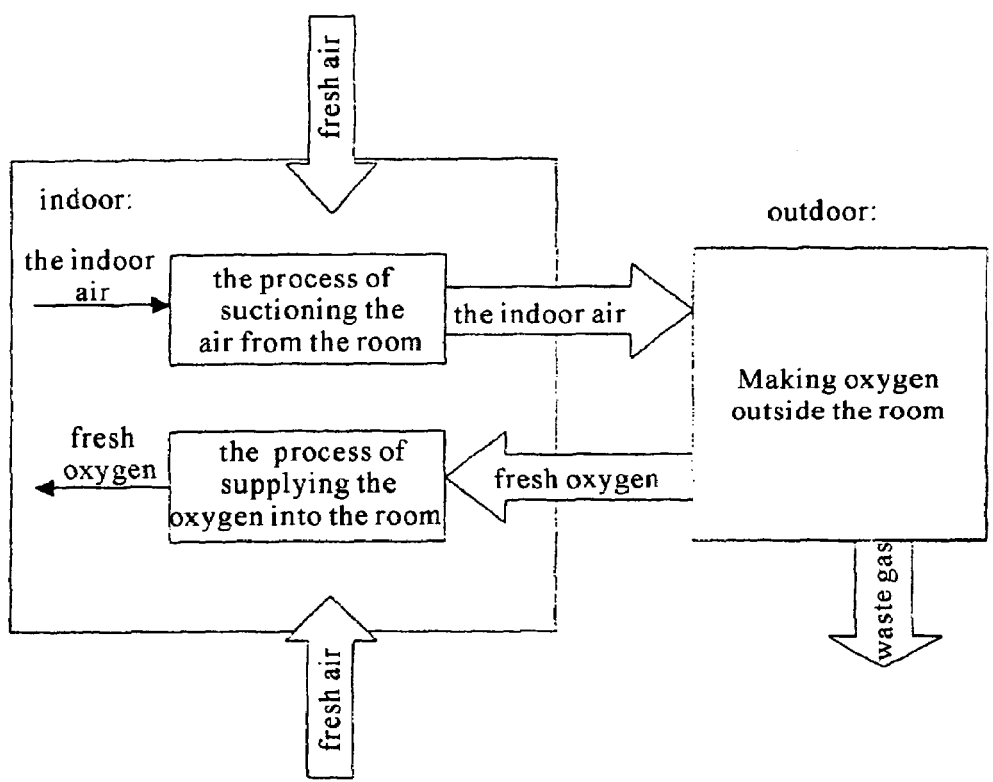
FIG. 1 is a schematic flow chart of circulating air and oxygen in a method for improving indoor air quality according to the present invention.

First, the operating principle of improving air quality in a limited space will be explained in detail by means of improving indoor air quality. Referring to FIG. 1, a method for improving indoor air quality includes suctioning air from the room during a process of suctioning air from the room. Then suctioned air is transferred outdoor for a process of making oxygen outside the room after being purified. Oxygen is extracted from the purified air and the waste gas generated therefrom is directly discharged outdoor. Finally, extracted oxygen is transferred into the room through a process of supplying oxygen into the room for breath. As suctioning air from the room, there is a pressure difference formed between indoor and outdoor. This pressure difference forces fresh air to flow into the room, thereby enhancing update of air in the room.

Figure 2:
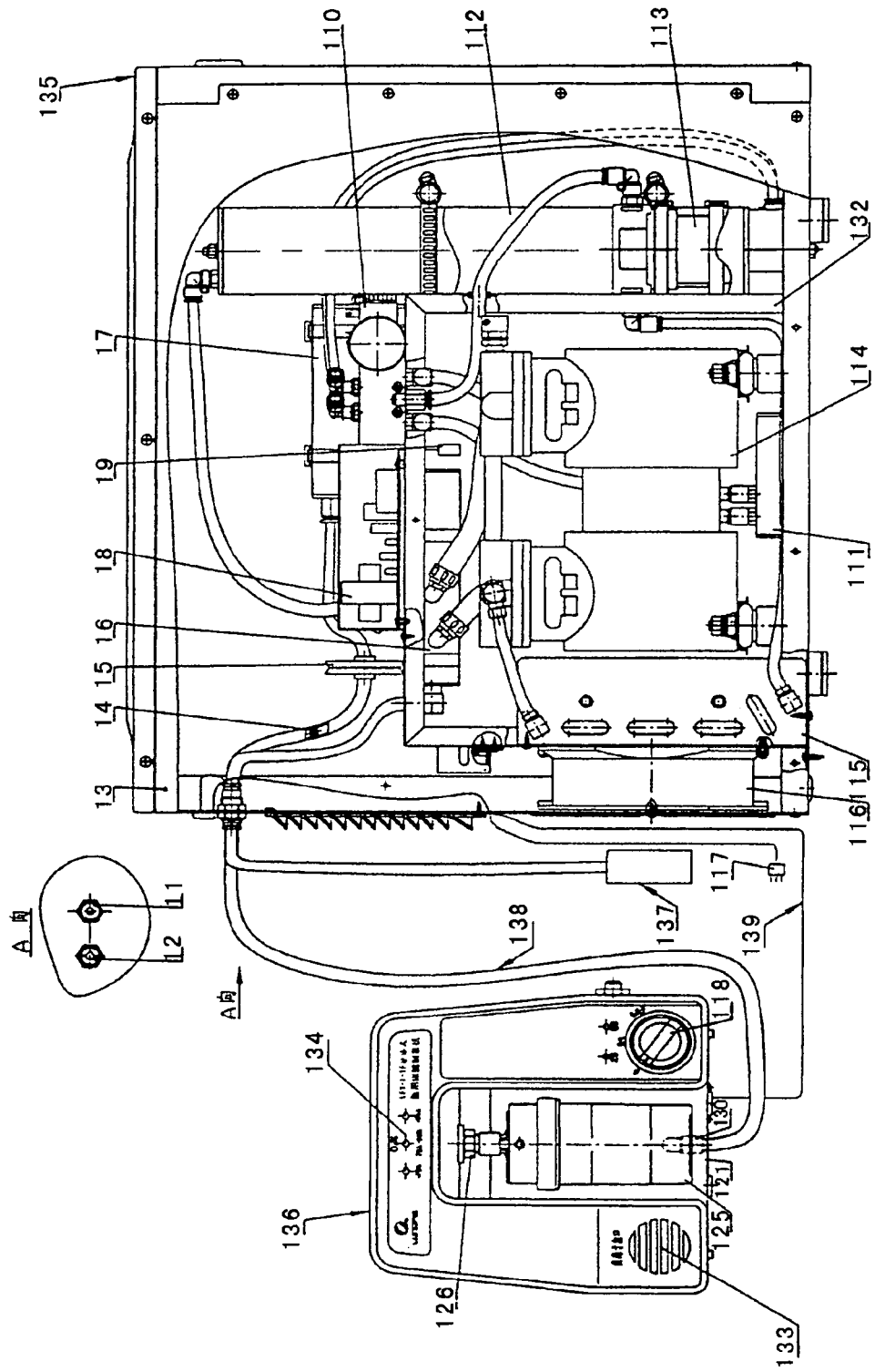
FIG. 2 is a schematic representation of an equipment for improving indoor air quality according to the present invention.
Figure 3:
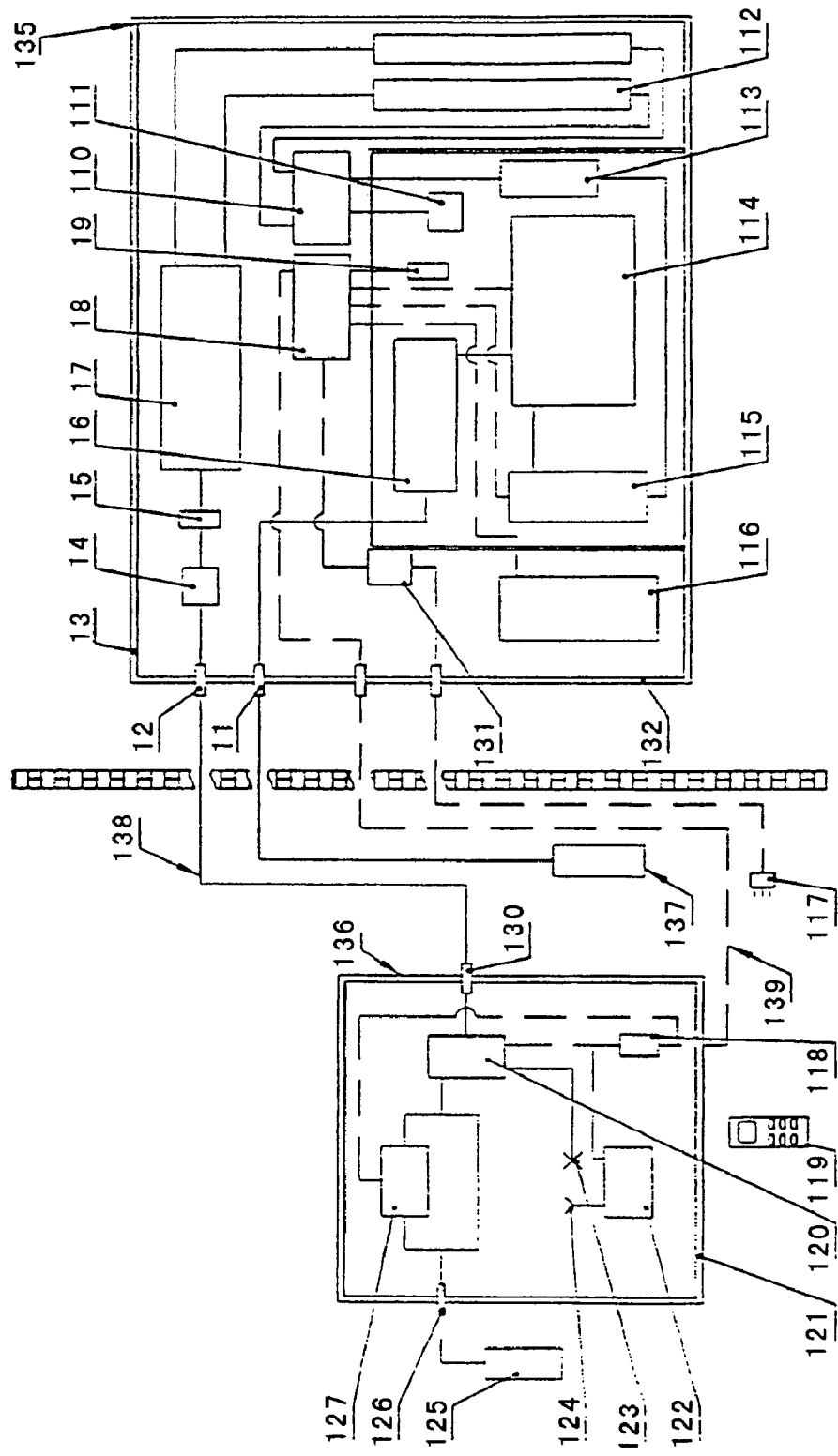
FIG. 3 is a schematic representation of connecting relationship among components of the equipment for improving indoor air quality according to the present invention.

Referring to FIGS. 2 and 3, according to the present invention, the equipment for improving indoor air quality includes an indoor machine, an outdoor machine, a pipe 138 and an electrical wire 139. The outdoor machine is an oxygen concentrator 135. The indoor machine includes an air-supply controller 136 and an indoor air-suction purger 137. The indoor machine and the outdoor machine are connected to the pip 138 and an electrical wire 139.

The indoor air-suction purger 137 includes a housing with grills, a filter net, and a filter element. The filter net and the filter element are enclosed in the housing. The air-suction purger 137 has an air inlet communicating the room so as to suction air from the room and an air outlet connecting to an air inlet of the oxygen concentrator through a pipe.

The oxygen concentrator includes an outer shell 13, an inner cabinet 132, an oxygen-extraction system, a temperature control equipment and a controller. The oxygen-extraction system and the temperature control equipment and the controller are disposed in the outer shell 13.

The controller is a computer program controller 18 attached to the inner cabinet 132. The temperature control equipment consists of a temperature sensor 19, a heat-dissipation blower 116 and a heat exchanger 115 with a heating pipe. The oxygen-extraction system includes an air inlet muffler 16, an air compressor 114, a gas-water separator 113, a control valve 110, a molecular sieve adsorber 112, an oxygen container 17, a bacterium filter 15 and an oxygen restriction hole 14.

The oxygen-supply controller includes a shell 121, an operating controller (not shown), an electromagnetic valve 120, an oxygen nozzle 123, an anion generator 122 and a display alarm 127 of oxygen concentration detection. The shell 121 includes an oxygen output port 126, an oxygen concentration indicator 134, an anion output port 133 and an electrical wire interface. The operating controller may be a manual control switch 118, a remote controller 119, or other IC or coin-operated type switches.

The oxygen-supply controller 136, the indoor air-suction purger 137 and a power line 117 of the oxygen concentrator are positioned in the room. The pipe 138 connects an oxygen outlet 12 of the oxygen concentrator to an oxygen input port 130 of the oxygen-supply controller 136. The electrical wire 139 connects the computer program controller 18 of the oxygen concentrator to the manual switch 118 of the oxygen-supply controller 136 and the display alarm 127 of oxygen concentration detection. The power line 117 connects to the panel 131 of the oxygen concentrator and the panel 131 connects to the computer program controller 18. The air outlet of the indoor air-suction purger 137 is connected to the air inlet 11 of the oxygen concentrator though the pipe. The oxygen concentrator 135 is positioned in the outer shell 13. The outer shell 13 includes an oxygen outlet 12, the air inlet 11, a blast inlet (a hole for power line) and a vent. The air inlet 11 is connected to an inlet of the air compressor 114 via a muffler 16. An outlet of the air compressor 114 is connected to the air-water separator 113 via the heat exchanger 115 with the heating pipe, thereby being connected to the control valve 110. The control valve 110 connects to the molecular sieve adsorber 112 at one end and thereof and to a vent muffler 111 at the other end thereof. An output port of the molecular sieve adsorber 112 is connected to the oxygen container 17. The oxygen container 17 is connected to the oxygen outlet 12 of the oxygen concentrator by the bacterium filter 15 and the oxygen restriction hole 14. The computer program controller 18 is attached to the inner cabinet 132 and the temperature sensor 19 thereof is mounted in the inner cabinet 132 together with the air compressor 114, the heat exchanger 115 with the heating pipe and the vent muffler 11. Neighboring to the heat exchanger 115, the heat-dissipation blower 116 is mounted between a vent on a sidewall of the inner cabinet 132 and a vent of the outer shell 13.

The oxygen input port 130 of the oxygen-supply controller 136 is connected to an inlet of a 3/2 directional electromagnetic valve 120 which is controlled by the manual switch 118. When the manual switch 118 is turned to "oxygen", the oxygen concentrator 135 starts to operate via a connecting wire. An outlet of the electromagnetic valve 120 is connected to the oxygen output port 126 of the oxygen-supply controller 136 and a medical humidification pot 125, and to the display alarm 127 of oxygen concentration detection with a bypass. When the manual switch is turned to "anion", the anion generator 122 operates while the oxygen machine 135 is operating, and the outlet of the electromagnetic valve 120 is turned to the oxygen nozzle 123.

According to the above-mentioned method for improving indoor air quality and the equipment used thereof, the equipment for improving indoor air quality includes the indoor purger 137 for performing the process of suctioning air from the room, the outdoor oxygen concentrator 135 for performing the process of making oxygen outside the room, and the indoor oxygen-supply controller 136 for performing the process of supplying oxygen into the room. The following will describe the operating principle in details.

The operating principle for improving air quality in the room is described as follows. After the power line of the oxygen concentrator 135 is connected to a power source, the oxygen concentrator 135 is turned on with a switch of the indoor machine, i.e., the manual switch 118, the remote controller 119 (wireless, infrared or handset type), and IC or coin-operated type switches. The indoor air-suction purger 137 suctions air from the room and suctioned air are transferred into the oxygen concentrator 135 after filter and purification. Then, after PSA, oxygen with high concentration is transferred into the indoor machine 136 through an oxygen restriction hole 14 in a constant flux after flowing through the bacterium filter 15. Nitrogen after separation is discharged into inner cabinet 132 through the vent muffler 111, and then is exhausted into ambient atmosphere by the blower of the air compressor 114 and the heat-dissipation blower 116. Oxygen transferred into the indoor machine 136 meets with medical standard. When the manual control switch 118 is turned to "oxygen", oxygen flows to the oxygen output port 126 of the indoor machine through the electromagnetic valve 120. Some of oxygen flows into the display alarm 127 of oxygen concentration detection through the bypass, and then flows to the oxygen output port 126 after detection. If the oxygen output port 126 is connected with a humidification pot 125, oxygen can be supplied for breath through a straw. If the humidification pot 125 is not used, oxygen with high concentration can be jetted directly into the room for improving indoor air quality. When the manual control switch 118 is turned to "anion", all oxygen inputted into the room is sprayed to an anion generator in a high speed through the oxygen nozzle 124. Then, oxygen is jetted into the room after ionization. Oxygen with anion can purge indoor air and improve indoor air quality. As set, the display alarm 127 of breathing oxygen concentration detection displays oxygen concentration through an annunciator, such as a LED, a digitron or a liquid crystal screen. When the oxygen concentration is less than a predetermined value, a sound and light alarm will alarm.

In the present invention, the air-suction purger 137 suctioning air from the limited space can ensure quality of the suctioned air (through filter and purification). In addition, in the present invention, the air compressor of the oxygen concentrator 135 is utilized to suction air from the limited space, thereby enhancing update of the air in the limited space.

The oxygen concentrator 135 of the present invention is designed with the heat exchanger 115 with the heating pipe, and the air-water separator 113, so that air compressed by the air compressor 114 can suffer heat dissipation and water removal prior to entrance into the control valve 110 and the molecular sieve adsorber 112. This is in favor of PSA, thereby enhancing the oxygen concentration. The heat-dissipation blower 116 of the oxygen concentrator and the heating pipe of the heat exchanger 115 operate under control of the computer program controller and provide a stable operating environment for the air compressor 114 positioned in the inner cabinet 132, which is not influenced by ambient environment. Please be noted, the lowest operating temperature of the present invention is 40° C. below zero.

Figure 4:
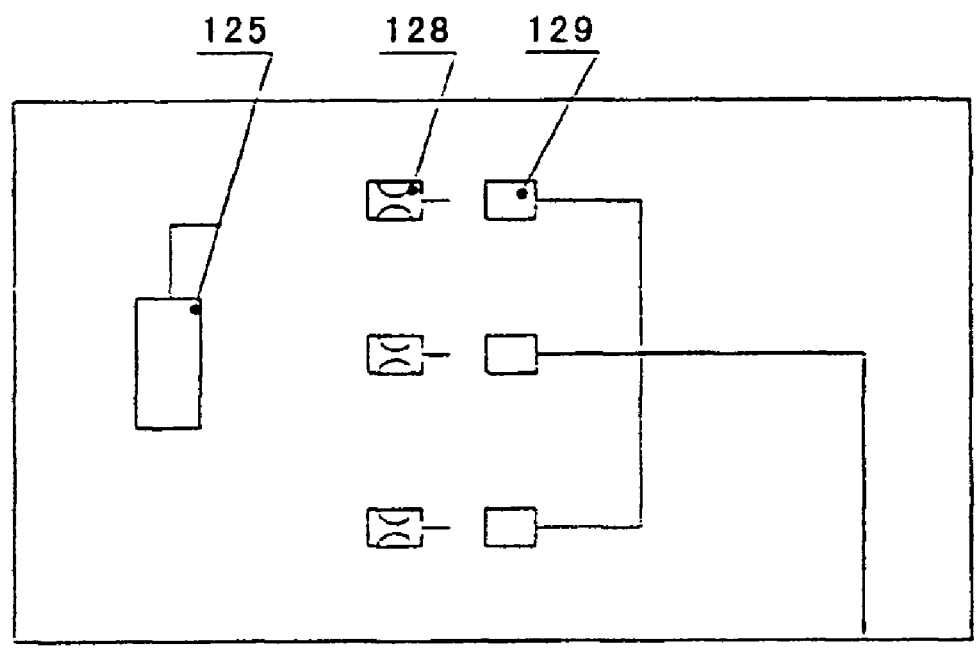
FIG. 4 is a schematic representation of connecting relationship among components of an oxygen-supply controller of an oxygen supplier according to another embodiment of the present invention.

FIG. 4 illustrates connecting relationship among components of the oxygen-supply controller 136 of an oxygen supplier according to another embodiment. The oxygen-supply controller 136 of the indoor machine consists of a plurality of output nozzle 129 with a self-sealing port thereof and a socket 128 with the restriction hole thereof. The oxygen-supply controller 136 may be equipped with a humidification pot 125 with a socket and a straw if required. The number of the output nozzles with the self-sealing port thereof and the sockets can be set upon the number of rooms. In the present invention, a wireless remote controller is used to control the outdoor oxygen concentrator 135 directly. After the outdoor oxygen concentrator 135 start to operate, if the socket 128 is connected, a certain of oxygen can be supplied to the room with the socket 128. If the humidification pot 125 is connected, oxygen can be supplied to a person with the straw.

In addition, the present invention can be applied in a limited space, such as an automobile. The operating principle and structure is similar to the above-mentioned oxygen concentration equipment, and the description is omitted herein. The detailed description is disclosed in Chinese Patent No. 03260811.X filed on Aug. 8, 2003.

Figure 5:
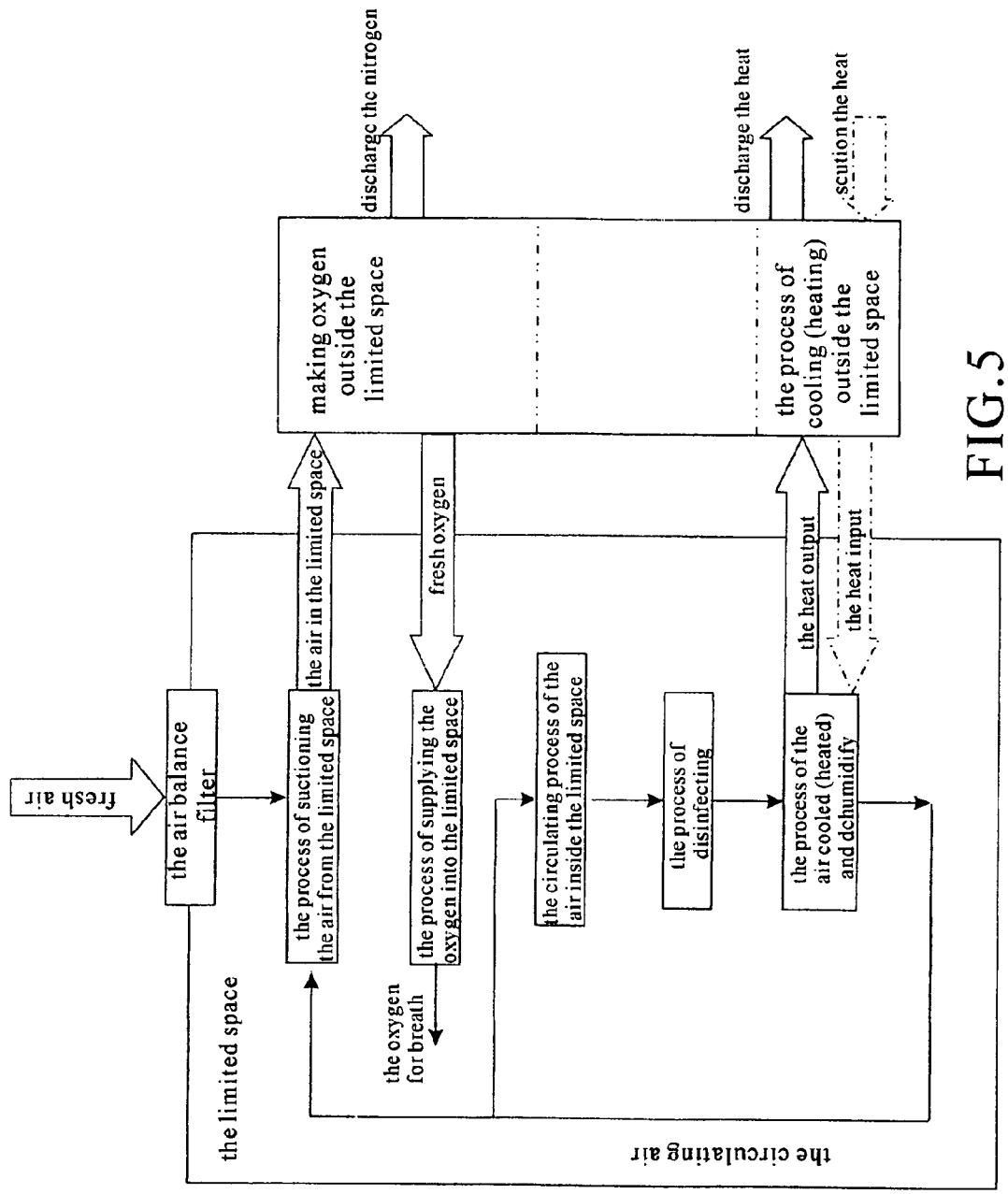
FIG. 5 is a schematic flow chart of air and oxygen in the method of suctioning air from a limited space and making oxygen outside the limited space according to another embodiment of the present invention.

The oxygen concentration equipment of the present invention can be used together with an air conditioner. Referring to FIG. 5, a method for improving air quality in the limited space according to another embodiment of the present invention includes the following processes: a circulating process of air in the limited space, a process of disinfecting, a process of cooling and dehumidification (air heating), a process of cooling (heating) of outdoor air conditioner, a process of suctioning air from the limited space, a process of making oxygen outside the limited space, a process of supplying oxygen into the limited space and a process of supplementing air into the limited space.

The detail steps are as below:

First, during the circulating process of air in the limited space, air in the limited space circularly flows through a disinfecting equipment such that the process of disinfecting is accomplished. Air after disinfecting then circularly flows through the heat exchanger such that a process of cooling and dehumidification (heating) is accomplished, thereby achieving temperature regulation and disinfecting in the limited space. Meanwhile, air is suctioned from the limited space and suctioned air is purged as an air source for making oxygen, thereby accomplishing the process of suctioning air from the limited space. Air after purification is transferred out of the limited space for the process of making oxygen outside the limited space. The nitrogen separated in the oxygen extraction is exhausted into ambient atmosphere, and the oxygen separated is transferred into the limited space for the process of supplying oxygen into the limited space. In addition, because the nitrogen separated from the suctioned air from the limited space is exhausted into ambient atmosphere, the oxygen transferred into the limited space is less than the suctioned air from the limited space, thereby creating a pressure difference between the limited space and ambient atmosphere. Ambient fresh air flows into the limited space through the air balance filter, thereby updating air in the limited space and accomplishing the process of supplementing air into the limited space. Therefore, air quality in the limited space is effectively improved.

Figure 6:
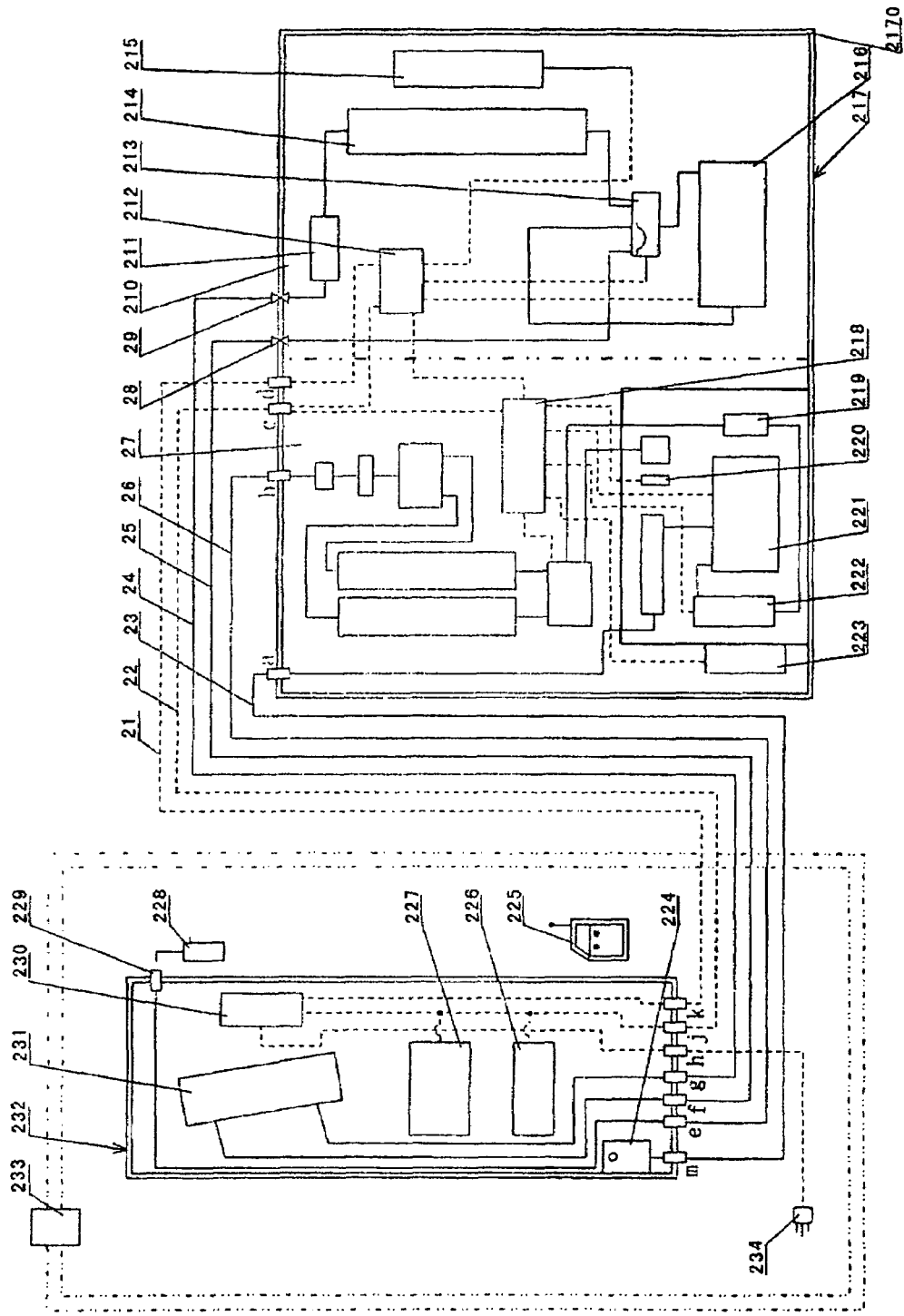
FIG. 6 is a schematic representation of connecting relationship among components of the oxygen concentration equipment according to another embodiment of the present invention.
Figure 7:
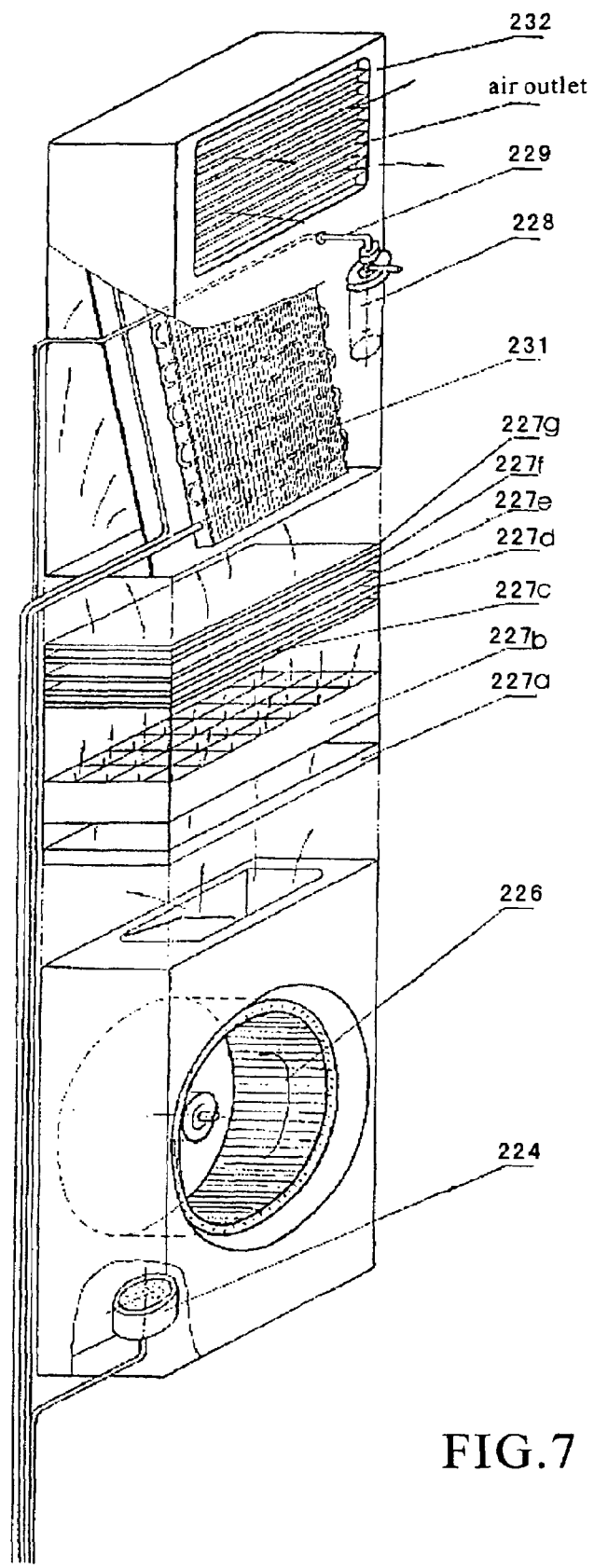
FIG. 7 is a schematic representation showing a structure of an indoor machine according to another embodiment of the present invention.

Referring to FIGS. 6 and 7, the equipment for improving air quality in the limited space according the present invention includes an outer machine 217, an inner machine 232, an air balance filter 233, and connecting pipes 23, 24, 25, 26 and electrical wires 21, 22 connecting the outer machine 232 and the inner machine 217. The outer machine 217 is positioned outside the limited space, and the inner machine 232 is positioned inside the limited space. As an air supplier in the present invention, the air balance filter 233 is positioned between the limited space and ambient atmosphere.

The outer machine 217 includes an outer shell 2170, an air conditioning cooling (heating) machine 210, an oxygen concentrator 27 and a controller. The air conditioning cooling (heating) machine 210, the oxygen concentrator 27 and the controller are positioned in the outer shell 2170. In addition, the outer shell 2170 has a liquid valve 29, a gas valve 28, an air inlet a, an oxygen output port b and an electrical interfaces c and d. The air conditioning cooling (heating) machine is a well-known product, and its detail description is omitted herein. The controller includes a controller 212 of the air conditioning cooling (heating) machine 210 and a controller 218 of the oxygen concentrator 27. Furthermore, the controller may be a composed controller, which can control both the air conditioning cooling (heating) machine 210 and the oxygen concentrator 27. The controller is connected to the electrical interface c of the outer machine via a wire.

The inner machine 232 includes an inner machine set for air conditioning (heating) (not shown), a disinfecting equipment 227, an oxygen-supply controller, an operating controller 230 and an air-suction purger 224. In addition, the indoor machine 232 has a gas pipe port f for an air conditioner, a liquid pipe port g, an air output port m and an oxygen input port e. The liquid valve 29 and the gas valve 28 of the outer machine 217 are connected to the liquid pipe port g and the gas pipe port f of the inner machine 232 respectively via a liquid pipe 24 and a gas pipe 36. Furthermore, the air input port a of the outer machine 217 is connected to the air output port m of the inner machine 232 through the connecting pipe 23.

The inner machine set for air conditioning cooling (heating) includes an inner blower 226 for circulating air and a heat exchanger (evaporator) 231. The heat exchanger 231 is connected to the liquid pipe port g and the gas pipe port f via pipes. In addition, the inner machine set for air conditioning cooling (heating) is a well-known product and its detail description is omitted herein. The disinfecting equipment is a multiple air treatment means, and it includes an air filter 227a, a cellular high-voltage field generator 227b, a micro-dust collector 227c, double layers of Photocatalyst and Silver Nano 227d, 227f, an ultraviolet disinfecting equipment 227e and an anion generator 227g. The disinfecting equipment 227 and the inner machine set of the air conditioning cooling (heating) share a common set of inner blower 226.

The oxygen-supply controller includes an oxygen output nozzle 229 with a self-sealing port thereof and a humidification pot 228 with an input socket and an output straw. The oxygen output nozzle 229 with the self-sealing port is connected to the oxygen input port e of the inner machine 232 via an oxygen pipe at one end thereof and to the input socket of the humidification pot 228 at the other end thereof.

The air-suction purger 224 has an air inlet and an air outlet. The air inlet is connected to a circulation flue of the inner machine 232 and the air outlet is connected to the air output port m of the inner machine. The air-suction purger 224 may include a housing with an air grill, a filter screen, and a filter element. The filter screen and the filter element are enclosed inside the housing.

The operating controller 230 is such a controller that control air conditioning cooling (heating) system, the disinfecting equipment and the outdoor oxygen concentrator. The air conditioning cooling (heating) system includes an air conditioning cooling (heating) machine 210 in the outer machine and an inner machine set of air conditioning cooling (heating) in the inner machine. The operating controller and the controllers 212, 218 in the outer machine is connected together through a controlling wire and work together. They may separately control the operation of the cooling (heating) system, or all or a part of the operation of the disinfecting equipment. In addition, they may control the operation of the oxygen concentrator separately or control all the equipments synchronously.

The air balance filter 233 is mounted on an outer wall of the limited space with its inlet communicating with ambient atmosphere and its outlet communicating with the limited space. When there is a negative pressure occurred, the air balance filter begins to operate and transfers fresh air into the limited space.

According to the above-mentioned equipment, the oxygen concentration equipment accomplishes the circulating process of air in the limited space via the blower 226 of the inner machine 232, the process of disinfecting via the disinfecting equipment 227 of the inner machine 232, the process of air cooling (or heating) via the heat exchanger (evaporator) 231 of the inner machine 233 and the air cooling (heating) machine 210 of the outer machine 217, the process of suctioning air from the limited space via the air-suction purger 224, the process of making oxygen outside the limited space via the oxygen concentrator 27 of the outer machine, and the process of supplying oxygen into the limited space via the oxygen-supply controllers 229, 230 of the inner machine.

When the power socket 234 of the inner machine 232 is connected to a power source, all or a part of the equipment may be actuated to work by the operating controller 230 or the remote controller 225 of the inner machine 232. When cooling starts, as shown in FIG. 6, refrigerant agent pressurized by the compressor 216 of the air conditioner is transferred into a condenser 214 through a shuttle valve 213. As the compressor 216 of the air conditioner collaborates with the outdoor blower 215, the refrigerant agent is refrigerated and liquefied. The refrigerant agent flows through a throttle equipment 211 and flows into the heat exchanger (evaporator) 231 of the inner machine through the liquid valve 29 and liquid pipe 24. The refrigerant agent expands and absorbs heat. Meanwhile, the air circulated by the inner blower 226 flows through the heat exchanger (evaporator) 231 and is refrigerated. Then, the air is transferred into the limited space from air outlet of the inner machine. During heating state, the shuttle valve 213 changes over. The refrigerant agent pressurized by the compressor 216 of the air conditioner flows into the heat exchanger 231 of the inner machine. Under influence of the air circulated by the inner blower, the refrigerant agent radiates heat and the circulating air is heated. The refrigerant agent after cooling and liquefaction flows through the restriction equipment 211 in a reversed direction and then expand to absorb heat in the condenser 214 of the outer machine.

As the disinfecting equipment 227 operates, the inner blower 226 circulates the air in the limited space into the disinfecting equipment 227 for disinfecting through a filter, such as the cellular high-voltage field 227b, the ultraviolet disinfector 227e, and the anion generator 227g. Even if the disinfecting equipment does not operate, as the air conditioning cooling (heating) functions, the circulating air may be purged as flowing through the disinfecting equipment.

When the oxygen concentration system operates, the air compressor 221 of the oxygen concentrator 27 suctions air from the limited space via the air-suction purger 224 of the inner machine 232. The suctioned air flows into the oxygen concentrator 27 after purification. The oxygen resulted from air separation flows into the oxygen-supply controller of the inner machine in a constant flux. Then, the oxygen flows into the limited space for breath via the oxygen output port 229 with the self-sealing port and the humidification pot 228. For example, the output of the humidification pot 228 may be coupled with a straw.

The oxygen concentrator 27 is equipped with a heater 222 and a temperature controller so as to ensure a normal operation under 40° C. under zero.

According to the present invention, in order to prevent danger, such as explode induced by mixture of air in the limited space and the oxygen inputted into the limited space, the ration of suctioned air in the process of suctioning air from the limited space to oxygen extracted in the process of making oxygen process and inputted into the limited space maintain more than 10. Furthermore, the air supplemented in the air supplement process equals the difference between the suctioned air in the process of suctioning air from the limited space and the supplied oxygen in the process of supplying oxygen. Therefore, the oxygen concentration in the limited space may be enhanced, and can be ensured under safety limits.

The invention claimed is:

1. A method for improving air quality in a limited space, comprising:
    a process of suctioning air from the limited space, comprising suctioning air from the limited space and transferring them outside the limited space as an air source for making oxygen;
    a process of making oxygen outside the limited space, comprising extracting oxygen from the air source transferred outside the limited space, and directly discharging waste gas generated therefrom outside the limited space;
    a process of supplying oxygen into the limited space, comprising transferring extracted oxygen into the limited space and supplying the oxygen via an oxygen-supply controller; and
    a process of supplementing air into the limited space, comprising supplying air into the limited space during the process of suctioning air from the limited space;
    wherein the oxygen is supplied to users in the limited space via a humidification pot and a straw during the process of supplying air into the limited space.

2. A method for improving air quality in a limited space, comprising:
    a process of suctioning air from the limited space, comprising suctioning air from the limited space and transferring them outside the limited space as an air source for making oxygen;
    a process of making oxygen outside the limited space, comprising extracting oxygen from the air source transferred outside the limited space, and directly discharging waste gas generated therefrom outside the limited space;
    a process of supplying oxygen into the limited space, comprising transferring extracted oxygen into the limited space and supplying the oxygen via an oxygen-supply controller; and
    a process of supplementing air into the limited space, comprising supplying air into the limited space during the process of suctioning air from the limited space;

wherein the oxygen is transferred into the limited space after ionization in an oxygen nozzle and an anion generator during the process of supplying air into the limited space.

3. The method for improving air quality in the limited space of claim 1 or 2, further comprising:
a circulating process of air in the limited space, comprising circulating air in the limited space through a disinfecting equipment and a heat exchanger so as to achieve temperature control and disinfecting in the limited space.

4. The method for improving air quality in the limited space of claim 1 or 2, wherein the process of supplementing air into the limited space starts as a negative pressure occurs in the limited space.

5. The method for improving air quality in the limited space of claim 1 or 2, wherein the ratio of the air suctioned in the process of suctioning air from the limited space to the oxygen extracted in the process of making oxygen outside the limited space and supplied in the process of supplying oxygen into the limited space is more than 10, and the air supplemented in the process of air supplement equals the difference between suctioned air in the process of suctioning air from the limited space and supplied oxygen in the process of supplying oxygen into the limited space.

6. An equipment for improving air quality in a limited space, comprising:
an inner machine positioned inside the limited space, comprising an air-suction purger and an oxygen-supply controller, wherein the air-suction purger comprises an air outlet and an air inlet communicating with the limited space, and the oxygen-supply controller comprises an oxygen input port and an oxygen output port;
an outer machine comprising an air inlet and an oxygen outlet, the air inlet being connected to the air outlet of the air-suction purger, the oxygen outlet being connected to the oxygen input port of the oxygen-supply controller; and
an air supplement equipment comprising an air input and an air output, the air input being outside the limited space and the air output being in the limited space;
wherein the outer machine comprises an outer shell, an inner cabinet, an oxygen-extraction system, a temperature control equipment and a controller, the oxygen-extraction system, the temperature control equipment and the controller being disposed in the outer shell;
wherein the oxygen-extraction system comprises an air input muffler, an air compressor, a gas-water separator, a control valve and a bacterium filter, the gas-water separator being connected to the control valve.

7. The equipment of claim 6, wherein the air-suction purger comprises a housing with air grills, a filter net and a filter element, wherein the filter net and the filter element are enclosed in the housing.

8. The equipment of claim 6, wherein the air supplement equipment is an air balance filter positioned between the limited space and ambient atmosphere.

9. The equipment of claim 6, wherein the oxygen-supply controller comprises a control switch, an electromagnetic valve, a medical humidification pot, a straw and a display alarm for detection of breathing oxygen concentration.

10. The equipment of claim 6, wherein the oxygen-supply controller comprises an oxygen nozzle, an anion generator and an anion output, wherein the anion generator comprises a carbon fibre head.

11. The equipment of claim 6, wherein the temperature control equipment comprises a heat-dissipation blower and a heat exchanger with a heating pipe, the heat exchanger being connected to the air compressor and the gas-water separator, and the heat-dissipation blower is mounted between the inner shell and the outer shell.

12. The equipment of claim 8, wherein the outer machine comprises an outer shell, and an air conditioning machine and an oxygen concentrator disposed in the outer shell.

13. The equipment of claim 8, wherein the inner machine comprises an inner machine set for air conditioning and a disinfecting equipment.

14. The equipment of claim 13, wherein the inner machine for air conditioning comprises an inner blower for circulating air and a heat exchanger.

15. The equipment of claim 13, wherein the disinfecting equipment comprises an air filter, a high-voltage field generator, a micro-duster collector, double layers of Photocatalyst and Silver Nano, an ultraviolet disinfector and an anion generator.

16. The equipment of claim 6,
wherein the inner machine comprises an inner machine set for air conditioning and a disinfecting equipment, and
wherein the inner machine for air conditioning comprises an inner blower for circulating air and a heat exchanger,
wherein the disinfecting equipment comprises an air filter, a high-voltage field generator, a micro-duster collector, double layers of Photocatalyst and Silver Nano, an ultraviolet disinfector and an anion generator.

* * * * *